United States Patent [19]
Depew et al.

[11] Patent Number: 6,092,779
[45] Date of Patent: Jul. 25, 2000

[54] PROTECTION CLIP DEVICE FOR SECURING PERSONAL HAND CARRIED ITEMS

[76] Inventors: Winston Stevens Depew, 9526 W. Menadota Dr., Peoria, Ariz. 85382-4193; Gay Lynn Depew, 9526 W. Menadota Dr., Peoria, Ariz. 85382

[21] Appl. No.: 09/263,059

[22] Filed: Mar. 8, 1999

[51] Int. Cl.[7] ............ F16M 13/00; F16B 45/00; A47G 1/10
[52] U.S. Cl. ............ 248/551; 248/305; 248/316.7; 248/304
[58] Field of Search .................... 248/305, 551, 248/306, 316.7, 229.12, 231.61, 304

[56] References Cited

U.S. PATENT DOCUMENTS

| | | | |
|---|---|---|---|
| 350,807 | 10/1886 | Clark | 248/305 |
| 1,143,749 | 6/1915 | Clarke | 248/304 |
| 4,211,734 | 7/1980 | Cheng | 248/231.61 |
| 4,836,483 | 6/1989 | Dale, Jr. | 248/231.61 |
| 4,943,024 | 7/1990 | Meyer | 248/305 |
| 5,653,414 | 8/1997 | Chimel | 248/316.7 |

*Primary Examiner*—Leslie A. Braun
*Assistant Examiner*—Jon A Szumny

[57] ABSTRACT

The invention relates to an improved clip device to which the strap or handle of a person's hand carried item, such as a lady's handbag or a camera, is attached to secure and protect it from theft. The improved clip is intended to be used out in a public place and would be attached to a heavy object such as a dining table, a gaming device stand or to a shopping cart basket, whereby the hand carried item would be fastened to the clip to prevent it from being snatched away and stolen. This allows the owner's attention to be directed to the activities at hand rather than be concerned about the safety of their item.

3 Claims, 1 Drawing Sheet

US 6,092,779

PROTECTION CLIP DEVICE FOR SECURING PERSONAL HAND CARRIED ITEMS

BACKGROUND OF THE INVENTION

The Present invention relates in general to a security device to protect personal items and more specifically to an improved clip device for holding to secure hand-carried items having a strap or handle, such as a lady's handbag or a camera. Although not limited as follows the invention is intended to be attached to a heavy object such as a table, counter, stand or shopping cart basket to enable a person while out in a public place to attach their hand carried item by its strap or handle to a nearby clip to secure the item close to them to deter and prevent a potential thief from snatching it away. Most commonly this would be while sitting to dine, relax or any other sit down activity, or while shopping and using a shopping cart.

Although there exists other various clip devices none have been specifically designed, or are presently in use, to protect hand carried items having straps or handles as the present invention relates to above.

BRIEF SUMMARY OF THE INVENTION

The improved clip will normally be used out in a public place and is to be attached to any heavy object such as underneath the edge of a dining table or counter, a gaming table or stand as in a casino, or to a shopping cart basket.

Usually when a person sits down at a table or counter to dine or relax, or uses a shopping cart to shop, any item they are carrying having a strap or handle is generally laid to rest loose, unattended closeby exposing it to possible theft while the owner is involved and concentrating with some other activity.

Using an improved clip that is available close at hand to attach their hand carried item by its strap or handle will eliminate the threat of having the item snatched away and stolen, thereby allowing the owner to direct their attention to enjoying the activity at hand without having to continuously monitor the security of their item. It also allows the owner instant access to the item because it is near them and visible even though it is secured to the clip.

DETAILED DESCRIPTION OF THE INVENTION

Figure 1:
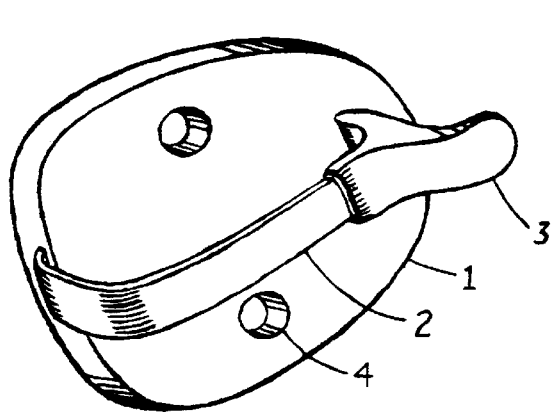
FIG. 1 is a top perspective view of the protection clip device.
Figure 2:
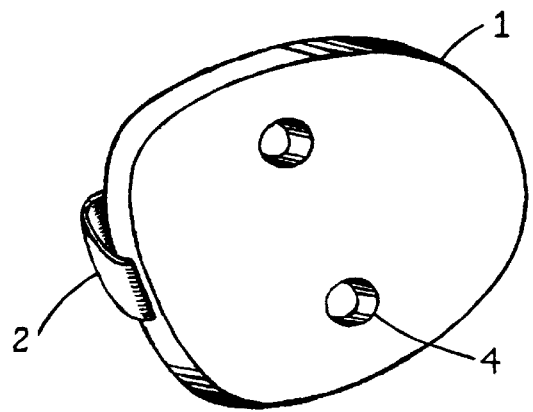
FIG. 2 is a bottom perspective view of the protection clip device.

FIG. 1 is an overall perspective of our improved clip device comprised of a rigid flat platform (1), a pliable spring-action arm (2) and a slightly rearward curved hook (6) with a finger tab (3). The flat platform (1) can be constructed of rigid metal or plastic, without or with fastening holes should screws, bolts or similiar hardware be required. Normally double stick tape or most strong adhesives work well for fastening. The platform (1) acts as both the main support for the entire clip and as the fastening point for attachment to a heavy object such as a table, counter, stand or to a shopping cart basket.

Figure 6:
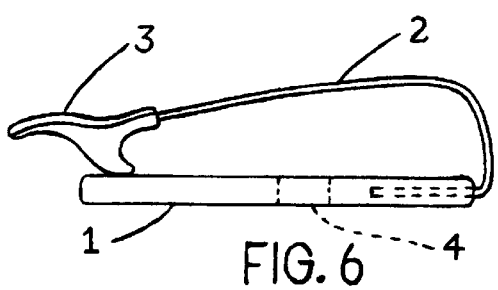
FIG. 6 is a side elevation view of the protection clip device with the pliable spring-action arm, hook and finger tab in its closed position.

Firmly connected to, or moulded within, the wide end of the platform (1) is a pliable, spring-action arm which arches up, over and gently down to the opposite end to touch firmly against the flat platform with the attached rearward curved hook (6) and a finger tab (3) which protrudes out just beyond the platform and slightly curves down to accommodate the shape of a finger. The spring-action arm in its normal closed position which is snugly pressed to the platform (1) creates an enclosed area (FIG. 6) to contain the strap or handle of the personal item being secured. When the clip is to be used the arm (2) is raised by lifting the finger tab (3), creating an aperature for entering the item's strap or handle inside the clip's enclosed area. Next, the finger tab (3) is released and the arm (2) springs back to its normal, closed position to secure the item by its strap or handle. In this condition a sharp tug on the now secured item would force the strap or handle into the clip's rearward curved hook (6), not only catching the strap or handle firmly to prevent their slipping out from underneath the hook, but actually pulling the arm to press it more tightly against the platform, increasing the effectiveness of the clip. When it becomes time to remove the item from the clip the arm (2) is raised open by pressing up on the finger tab (3) then withdrawing the strap or handle.

The materials used for construction of the improved clip can be of all metal, all plastic, or a combination of both which the accompanying drawings depict. Regardless of which materials are used the arm (2) must be pliable with a strong spring-action effect so that it automatically returns to a closed position after being opened. The clip's method of construction is not limited as depicted by the accompanying drawings.

Figure 3:
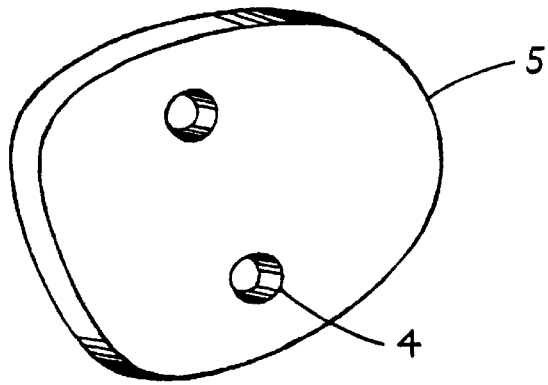
FIG. 3 can be either the top or bottom perspective view of the backing plate, which is reversible, to be used to enhance fastening the protection clip device in certain installations.
Figure 4:
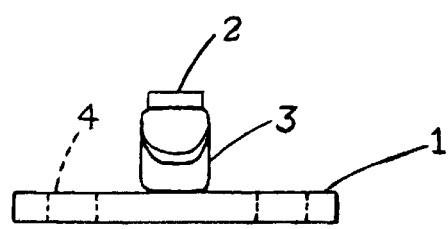
FIG. 4 is an end elevation view of the protection clip device when facing the finger tab, or front of the clip.
Figure 5:
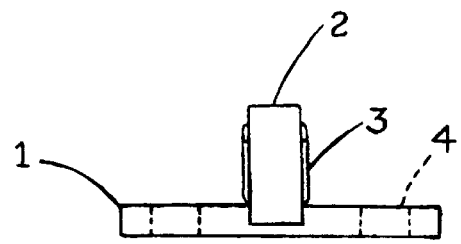
FIG. 5 is an end elevation view of the protection clip device from the back, or opposite end of the finger tab.

An additional use of the improved clip is with a shopping cart. Its attachment would be to the inside and top of the cart's basket, above the child's seat and near the push handle. This can be accomplished by various methods, depending on what the basket is made of and its design. The clip (FIG. 1) can be fastened to most cart's metal or plastic basket by the optional use of a backing plate such as shown in FIG. 3, with matching fastening holes using bolts, rivets or other appropriate hardware. The clip (FIG. 1) can also be fastened to a metal or plastic cart basket using a very strong glue such as epoxy cement. Additionally, the clip can be moulded into and become an integral part of the cart's plastic basket as it is being constructed by the manufacturer.

The features of our improved clip that make it unique are:
 (a) its relatively small size to fit rather inconspicuously underneath the edge of a table or counter, or on the side of whatever heavy object it is being attached to.
 (b) that it can be made into any color to match and correspond with most any decor.
 (c) the slightly rearward curved hook (6) which is designed to catch and contain an item's strap or handle if yanked upon to prevent them from slipping out from underneath the hook (6) when the clip is in its closed position.
 (d) the finger tab (3) which curves slightly downward to easily accommodate the shape of a finger to enhance lifting open the spring-action arm (2).

We claim:

1. A clip device for attachment to a heavy object such as a table, counter, stand or shopping cart basket for securely holding a hand carried item having any type of strap or handle, the device clip comprising;

a rigid, flat supporting platform having a smooth finish; said platform having a top, bottom and side surfaces; said platform having a securing means thereon for attaching said clip device to said heavy object;

a strong, pliable spring-action clip arm attached or moulded securely at a first end to the side surface of said platform, said clip arm arching up, over and downward over said top surface of said platform and having a strong tension whereby a second end of said clip is in firm contact with the flat platform's top surface, thus forming a complete, endless enclosure for holding the strap or handle, and to maintain a closed position whereby the second end of the clip arm is in constant contact with said platform when not being manually pressed open for insertion or removal of said strap or handle;

a smooth, curved hook securely attached or moulded to the second end of the spring-action arm clip, said curved hook having a free end that extends downwardly in a direction toward the first end of the clip arm and contacts said top surface to catch and contain a strap or handle from slipping underneath when sharply pulled upon;

and a finger tab moulded with and above the hook, said finger tab extending in a direction away from said first end of said clip arm and beyond the edge surface of the flat platform, said finger tab curving slightly downward at its outermost end and adapted to conform to the shape of a finger to enhance leverage when opening the clip arm.

2. The clip device of claim 1 wherein said securing means is an adheasive.

3. The clip device of claim 1 wherein said securing means is formed of at least one hole adapted to receive fastening hardware such as screws, bolts or rivets.

* * * * *